Feb. 25, 1964 — W. H. HULTGREN — 3,122,501

FUEL FILTER

Filed Sept. 1, 1960

WILLIAM H. HULTGREN
*INVENTOR.*

BY *Lawrence J. Winter*
ATTORNEY 3,122,501
FUEL FILTER
William H. Hultgren, Readington, N.J., assignor to Puro-
lator Products, Inc., Rahway, N.J., a corporation of
Delaware
Filed Sept. 1, 1960, Ser. No. 53,560
4 Claims. (Cl. 210—94)

The present invention relates to a filter, and more particularly, to a fuel filter.

An object of the present invention is to provide a filter unit having a transparent body member to enable an operator to know when water has collected therein so that the filter body may be dismantled and the collected water emptied therefrom.

Another object of the present invention is to provide a molded filter body member made of transparent nylon which will enable an operator to visually determine when contaminants and water have collected therein so that the body may be removed from the filter head and the contaminants emptied to prevent clogging of the fuel line downstream of the filter.

Another object of the present invention is to provide a transparent nylon plastic filter body which enables the operator to determine when collected water droplets contained in the fuel must be removed from the filter body, which plastic body will not chemically react with the aromatics or other components in fuel and become frosted and opaque.

Another object of the present invention is to provide a transparent nylon casing for visually determining when filtered contaminants must be emptied therefrom, which casing is supported by the filter element under elevated temperatures and requires no separate reinforcement means as used heretofore.

Still another object of the present invention is to provide a transparent nylon casing with reinforcement means formed integrally therein to keep the casing from creeping inwardly under subatmospheric pressure.

Figure 1:
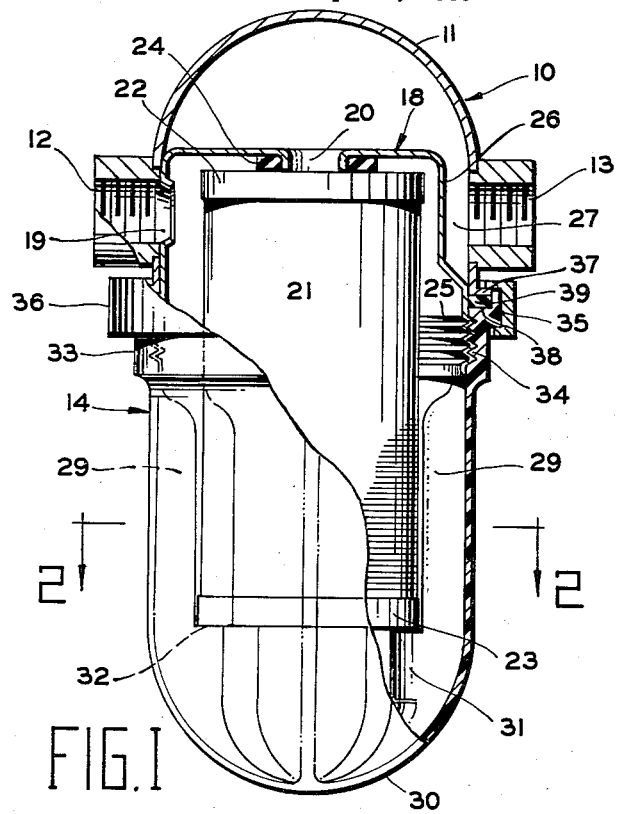
Figure 2:
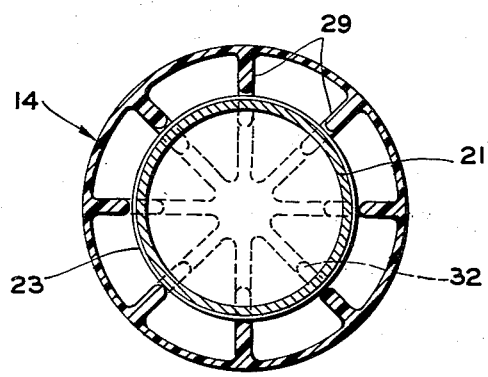

Various other objects and advantages of the present invention will become readily apparent from the following detailed description, when considered in connection with the accompanying drawing forming a part thereof, and in which:

FIG. 1 is an elevational view, partly broken away and in section, illustrating the invention; and FIG. 2 is a cross-section taken on line 2—2 of FIG. 1.

Referring to the drawings, the reference numeral 10 designates a filter comprising a dome-shaped cup or head 11 having threaded connections forming an inlet passage 12 and outlet passage 13. A cylindrical casing or body member 14 is threadably connected to the head. The connections are preferably brazed to the oppositely disposed openings in the cup to provide fluid-tight joints therearound. A cylindrical member 18 is inserted in the lower portion of the cup and forms a press-fit with the inner surface of the cup. An opening 19 in the side wall of the cup communicates with inlet passage 12 to receive diesel fuel, gasoline or the like. A central opening is formed in the top of the cylindrical member by a downwardly turned rim 20.

A filter element 21 is disposed in casing 14 and is preferably a wire-wound metal edge type element, as described in Patent 2,622,738 to Kovacs, having metal end caps 22 and 23 sealing off the opposite ends. An annular rubber gasket 24 secured to the upper end cap seats around rim 20 in a fluid-tight manner. The lower end of cylindrical member 18 has external threads 25, while the upper wall portion 26 of member 18 adjacent outlet passage 13 is indented to provide a discharge chamber 27 in communication with the outlet and the interior of the cup.

The diameter of the cylindrical member is of sufficient size so that it forms a press-fit with the cup to provide a fluid-tight joint therebetween. The cylindrical member may further be brazed to the cup if desired, to insure a leak-proof joint.

Casing 14 is preferably molded and is of clear transparent nylon so that an operator may determine when the filter element enclosed within the filter assembly has collected water droplets and contaminants requiring the casing to be unscrewed from the cup and emptied of the contaminants so they will not be forced through the filter element to eventually clog the fuel line.

The casing has a plurality of spaced longitudinally extending inner ribs 29 with each rib extending from a common apex in the dome-shaped bottom 30 of the body. The ribs have enlarged lower sections 31 extending inwardly of the upper portion of the ribs to provide spaced shoulders 32 on which seat the lower end cap of the filter element to support the element. When the casing is properly secured to the head, the shoulders force gasket 24 against the top of the cylindrical member 18 to form a fluid-tight joint therewith. The open end of the casing has a flange 33 thereon with internal threads 34 which mate with the corresponding threads 25 of member 18. Flange 33 does not have to be transparent, and is made thicker than the cylindrical wall of the casing for greater strength and so that the threads may be readily formed therein.

In connection with the above, it is, of course, well-known that nylon is transparent only when in the form of a relatively thin sheet or wall. Thus, as noted above, the thickness of the flange 33 prevents transparency while providing adequate strength. The side wall and bottom of the casing 14 present a large area to the atmosphere and when, as sometimes happens under normal service conditions, the internal pressure drops below atmospheric pressure, the casing receives relatively heavy collapsing pressures. This is why the casings of commercialized fuel filters have been made of metal or heavy glass. The drawings show the use of nylon thin enough for transparency, and the casing therefore would not have adequate strength in the absence of the ribs that support the casing when braced against the filter cartridge. The drawings also show that the ribs are relatively thin and are radially arranged so that they do not prevent easy visual inspection of the interior of the casing.

A resilient ring gasket 39 is disposed on shoulder 38 of flange 35 on the end of the casing to act as a seal between the casing and head. A conventional split ring clamp 36 fits over an outwardly turned lip 37 on the head and the bottom of flange 35 to prevent the casing from inadvertently coming loose from the filter cup due to vibrations in an engine.

The provision of the inwardly extending ribs 29 prevents the transparent nylon plastic body from collapsing inwardly so that the nylon casing will not lose its shape when the engine temperature under the hood of an internal combustion engine becomes heated during operation of the engine. The ribs also prevent the plastic body from collapsing inwardly due to creep in the plastic material when the interior of the casing is under a subatmospheric pressure. The nylon ribs extend inwardly of the cylindrical surface of the casing a sufficient distance so that they just clear the outer surface of the filter element 21, thereby permitting the ribs to expand inwardly against the metal filter element 21 when the engine temperature under the hood is approximately 250° F., to utilize the metal filter element as a reinforcement support to prevent collapse or deformation of the thin transparent nylon body casing under elevated temperature conditions. It is also readily apparent that the filter element may be a conventional annular pleated paper element with rigid paper or metal end caps against which the ribs abut when the casing tends to collapse due to high temperatures or plastic creep accompanying a vacuum pressure in the fuel line. The nylon will not chemically react with aromatics or other components in diesel fuel to become frosted or opaque, but will retain its transparency so that the operator may always determine when sufficient water droplets and contaminants have been accumulated in the casing, requiring dismantling of the filter body member from the cup to empty the unwanted contaminants. The provision of the inwardly extending ribs which expand inwardly against the metal filter element to reinforce the thin plastic filter body further eliminates the need for perforated metal inserts or other separate reinforcement members required heretofore to support a transparent nylon casing under high engine temperature conditions.

Inasmuch as various changes may be made in the form, location and relative arrangement of the several parts without departing from the essential characteristics of the invention, it will be understood that the invention is not to be limited except by the scope of the appended claims.

What is claimed is:

1. A fluid filter including a casing having an inlet passage and an outlet passage, a filter element, and means for mounting said element inside of said casing with the latter defining a space for confining a fluid flow for passage through the element and which collects material filtered from the fluid by the element, said casing being made of material that is transparent but only when too thin to by itself resist collapsing pressure, said casing having a plurality of interspaced projections extending from its inside to locations where their inner ends engage said element and are braced thereby to resist collapse of said casing, said element including a radially rigid metal end cap attached thereto and located in radial registration with said projections, the casing between said projections forming transparent wall portions thin enough to be transparent and located to permit visual inspection of said space.

2. A fluid filter including a casing having an inlet passage and an outlet passage, a filter element, and means for mounting said element inside of said casing with the latter defining a space for confining a fluid flow for passage through the element and which collects material filtered from the fluid by the element, said casing being made of material that is transparent but only when too thin to by itself resist collapsing pressure, said casing having a plurality of interspaced projections extending from its inside to locations where their inner ends engage said element and are braced thereby to resist collapse of said casing, said element including a radially rigid metal end cap attached thereto and located in radial registration with said projections, the casing between said projections forming transparent wall portions thin enough to be transparent and located to permit visual inspection of said space; said material being nylon and said casing including its said projections being an integral molding.

3. A fluid filter including a casing having an inlet passage and an outlet passage, a filter element, and means for mounting said element inside of said casing with the latter defining a space for confining a fluid flow for passage through the element and which collects material filtered from the fluid by the element, said casing being made of material that is transparent but only when too thin to by itself resist collapsing pressure, said casing having a plurality of interspaced projections extending from its inside to locations where their inner ends engage said element and are braced thereby to resist collapse of said casing, said element including a radially rigid metal end cap attached thereto and located in radial registration with said projections, the casing between said projections forming transparent wall portions thin enough to be transparent and located to permit visual inspection of said space; said material being nylon and said casing including its said projections being an integral molding; said projections being in the form of ribs which extend longitudinally and are circumferentially interspaced with respect to the casing, said ribs being thin enough to make said visual inspection easy.

4. A fluid filter including a casing having an inlet passage and an outlet passage, a filter element, and means for mounting said element inside of said casing with the latter defining a space for confining a fluid flow for passage through the element and which collects material filtered from the fluid by the element, said casing being made of material that is transparent but only when too thin to by itself resist collapsing pressure, said casing having a plurality of interspaced projections extending from its inside to locations where their inner ends engage said element and are braced thereby to resist collapse of said casing, the casing between said projections forming transparent wall portions thin enough to be transparent and located to permit visual inspection of said space; said material being nylon and said casing including its said projections being an integral molding; said projections being in the form of ribs which extend longitudinally and are circumferentially interspaced with respect to the casing, said ribs being thin enough to make said visual inspection easy; said casing having a domed closed end and said filter element terminating in spaced relation to said end and said ribs extending throughout said end and merging centrally thereof, said ribs having portions for engaging the adjacent portion of said element, said portion including a radially rigid metal end cap attached to said element.

References Cited in the file of this patent

UNITED STATES PATENTS

| | | |
|---|---|---|
| 639,769 | Raab et al. | Dec. 26, 1899 |
| 2,488,921 | Mathews | Nov. 22, 1949 |
| 2,687,997 | Marchand | Aug. 31, 1954 |
| 2,932,398 | Korte | Apr. 12, 1960 |